United States Patent
Bucchieri

(10) Patent No.: US 8,032,296 B2
(45) Date of Patent: Oct. 4, 2011

(54) METHOD AND SYSTEM FOR PROVIDING VIDEO MAPPING AND TRAVEL PLANNING SERVICES

(75) Inventor: Vittorio Bucchieri, Wakefield, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 733 days.

(21) Appl. No.: 12/112,264

(22) Filed: Apr. 30, 2008

(65) Prior Publication Data

US 2009/0276151 A1    Nov. 5, 2009

(51) Int. Cl.
*G01C 21/00* (2006.01)
(52) U.S. Cl. ........ 701/202; 701/117; 701/211; 701/300; 340/995.12; 340/995.19
(58) Field of Classification Search ............. 701/23, 701/27, 202, 208, 211, 214, 300, 117, 118; 340/988, 995.12, 995.17, 995.15, 995.19; 342/357.31
See application file for complete search history.

(56) References Cited

U.S. PATENT DOCUMENTS

| 6,140,943 A * | 10/2000 | Levine ................. 340/995.12 |
| 2006/0287818 A1 * | 12/2006 | Okude et al. ................. 701/209 |

* cited by examiner

*Primary Examiner* — Gertrude Arthur Jeanglaude

(57) ABSTRACT

An approach is provided for providing a first-person perspective video mapping service. Information corresponding to a geographic area is received from a subscriber of the mapping service over a network. One or more first-person perspective videos of at least a portion of the geographic area are retrieved based on the information. A first-person perspective video map is generated using the retrieved first-person perspective video(s) and is transmitted to the subscriber over the network.

25 Claims, 11 Drawing Sheets

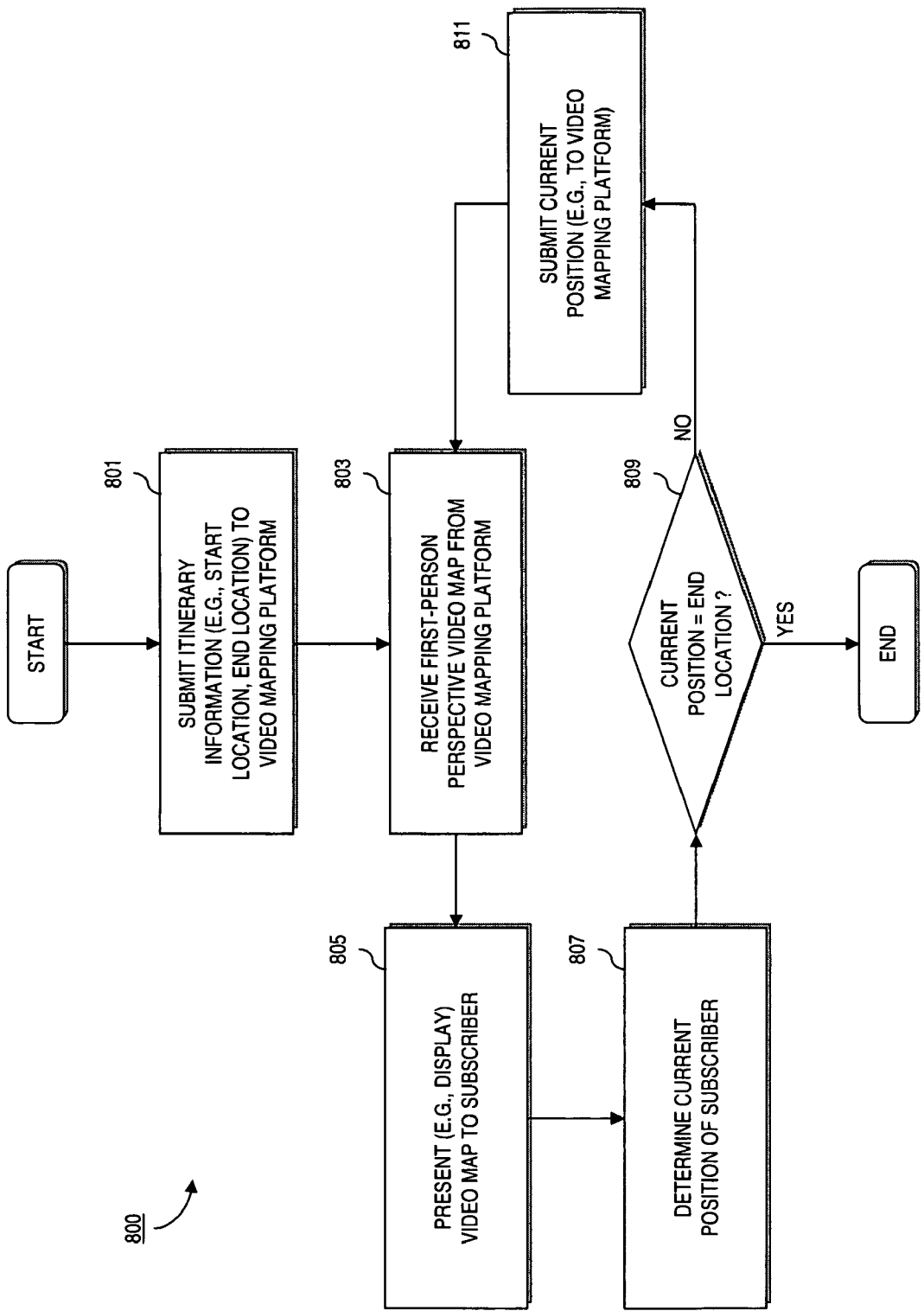

METHOD AND SYSTEM FOR PROVIDING VIDEO MAPPING AND TRAVEL PLANNING SERVICES

BACKGROUND INFORMATION

The advent of global communication networks, e.g., the Internet, has served as a catalyst for the ubiquity of digital computing devices, as well as the inauguration of increasingly more complex services, such as online mapping and imaging programs. In addition to fulfilling basic point-of-interest functions, these applications also serve as helpful navigational aids. Namely, users can now readily obtain directions to and from particular points-of-interest, not to mention, acquire satellite depictions of these locations. Furthermore, wireless communication technologies have served to increase the popularity of these services. That is, wireless communication devices, besides affording users with the convenience of mobility, have been engendering a continually expanding set of capabilities. For instance, as wireless technologies become more sophisticated, features have expanded from merely placing and receiving calls to enhanced services, such as downloadable multimedia content and navigational systems supported by, for example, global positioning system (GPS) technology. It is not surprising that these services are becoming critical, ever growing market segments. However, given the competitive landscape of the telecommunications industry, service providers are continually challenged to develop new products and services. Nevertheless, few applications have been developed to exploit the availability of mapping, multimedia, and navigational information.

Therefore, there is a need for an approach that provides enhanced mapping and navigational services through multimedia applications.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 8 is a flowchart of a process for dynamically obtaining and presenting video maps to users via client devices, according to an exemplary embodiment;

DESCRIPTION OF THE PREFERRED EMBODIMENT

A preferred apparatus, method, and software for providing video mapping and travel planning services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to global positioning system (GPS) technology, it is contemplated that the various exemplary embodiments are also applicable to other equivalent navigational and location determination technologies.

Figure 1:
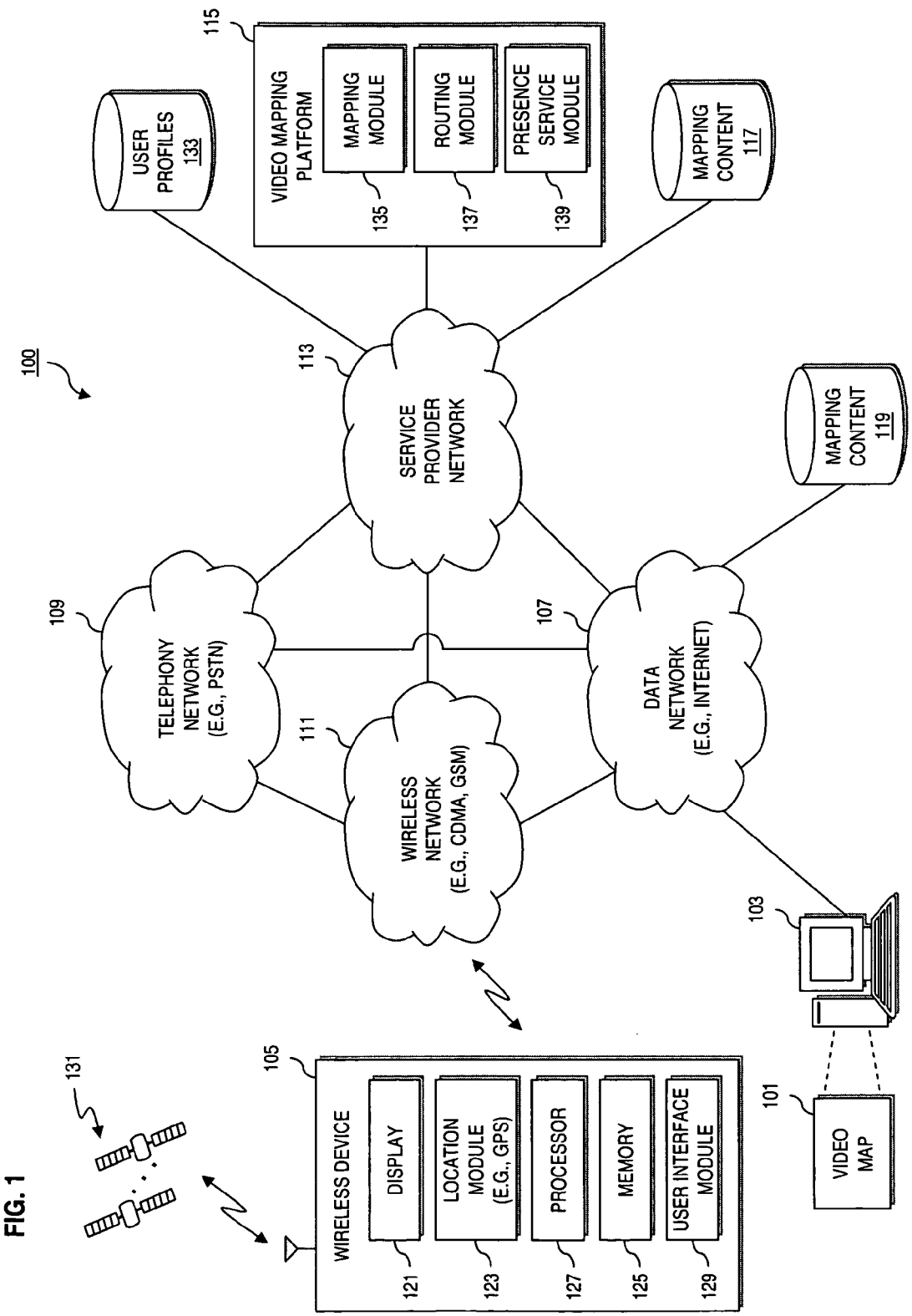
FIG. 1 is a diagram of a system capable of providing video mapping and travel planning services, according to an exemplary embodiment.

FIG. 1 is a diagram of a system capable of providing video mapping and travel planning services, according to an exemplary embodiment. For the purposes of illustration, a system 100 for providing video maps (e.g., video map 101) to one or more client devices (e.g., computing device 103 and/or wireless device 105) over one or more networks (e.g., data network 107, telephony network 109, and/or wireless network 111) is described with respect to service provider network 113. While specific reference will be made thereto, it is contemplated that system 100 may embody many forms and include multiple and/or alternative components and facilities.

Traditionally, mapping and travel planning services have employed graphical and textual descriptions of locations and itineraries. Users often print or otherwise reproduce this information for use during a trip, e.g., for location-to-location navigational directions. Owners of portable GPS devices, such as GPS-enabled cellular devices, GPS-enabled positioning technologies, GPS-enabled navigation devices, and the like, often rely on this same information but displayed to users via graphical user interfaces (GUI) or other like representations. In other instances, mapping and travel planning services have begun providing users with audio instructions in addition to the graphical and/or textual presentations. Even though these conventional maps and directions are often clear and provide users with various details and information, they are often too abstract. That is, users tend to experience difficulties trying to visually and mentally translate the aerial views, i.e., third-person perspective views, of a conventional presentation into immersed ground views, i.e., first-person perspective views, of the same location. Further, typical maps and/or navigational directions are generally graphically reproduced images with, in particular instances, a route path approximately overlaid on the images to illustrate an intended itinerary. These depictions can be "cartoon-like," i.e., not actual images of the locations being observed or traversed. While mapping and travel planning services are beginning to provide actual third-person perspective images of particular locations, e.g., satellite images, these images are still provided as aerial views.

Figure 3B:
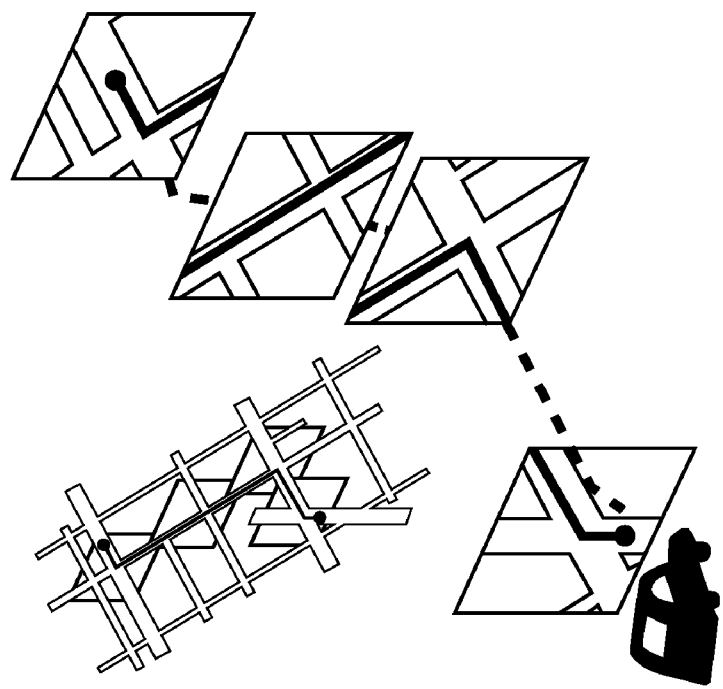
FIGS. 3A and 3B schematically illustrate the disjunction between aerial and first-person perspective views of an itinerary.
Figure 3A:
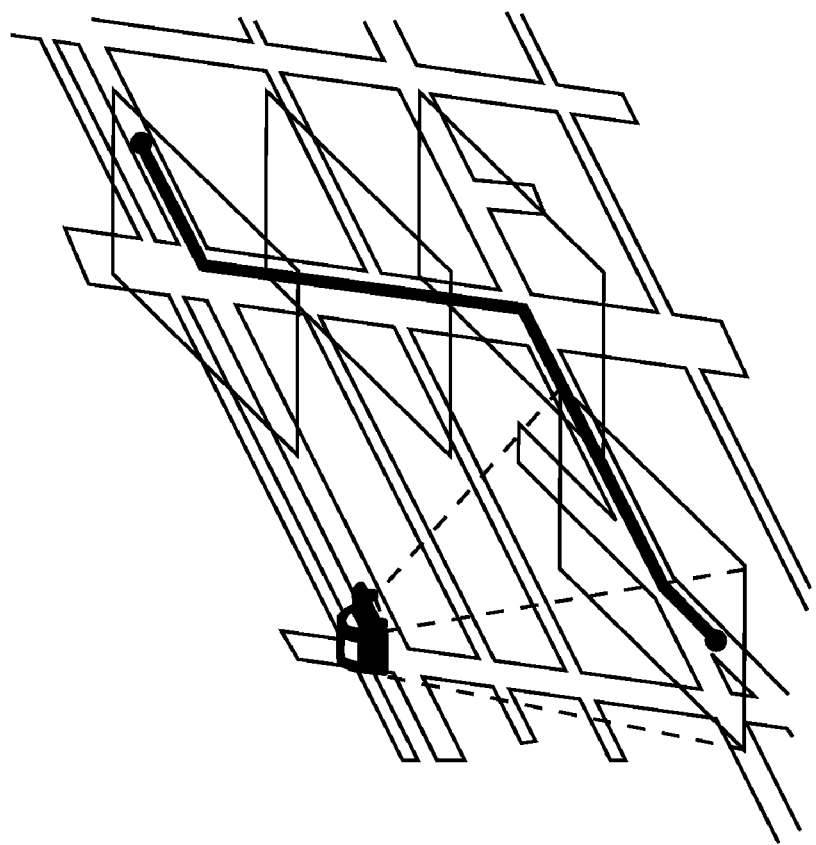

FIGS. 3A and 3B schematically illustrate the mental and visual disjunction experienced by users attempting to translate an aerially viewed itinerary into a first-person perspective viewed itinerary. As shown, the aerial view does translate well with the same location viewed from a first-person perspective. It is noted that individuals tend to have a better recollection of a location, or how to get to a location, from an actual first-person experience, as opposed to a memorized recollection acquired from a graphically reproduced conventional map. As such, conventional maps and/or navigational presentations are more appropriate for "air" travelers who may require "straight-down" or "slightly-angled" depictions of locations, as opposed to "ground" travelers who can benefit from first-person perspectives of the same locations. Therefore, it is apparent that improvements are needed.

Accordingly, the approach according to certain embodiments stems from the recognition that deploying first-person perspective video mapping and travel planning services, whereby subscribers can experience images or movies of locations and itineraries as if they were there, provides subscribers with valuable, real-like simulations that parallel, if not create, genuine experiences. Viewing such first-person perspective images or movies further provides subscribers with more effective visual information and travel cues given that the actual location can be experienced without requiring visual or mental translation. Moreover, these presentations enable subscribers to also perceive elements of a location/landscape, e.g., buildings, monuments, parks, signs, storefronts, vegetation, etc., that are often omitted by graphical maps, but frequently utilized by individuals as invaluable visual references and milestones. As such, mapping and travel planning services would greatly benefit from first-person perspective presentations that provide locations and directions from the same point of view of a user on the ground rather than on a hypothetical flight. Additional embodiments stem from the recognition that deploying first-person perspective video mapping and travel planning services that provide images or movies of locations and/or itineraries that closely mimic the circumstances expected to be experienced also serve to enhance the ability of users to virtually experience and learn about various locations and itineraries before actually visiting them.

According to one embodiment, system 100 introduces video mapping and travel planning services through a video mapping platform 115, whereby subscribers can obtain personalized video maps 101 corresponding to one or more geographic areas, e.g., cities, states, countries, continents, etc, and or one or more itineraries, e.g., driving, walking, etc. These video maps 101 may correspond to first-person perspective views or both first-person and third-person perspective views of the geographic areas or itineraries. In this way, platform 115 utilizes one or more repositories of mapping content, e.g., repositories 117 and 119, including first-person perspective images and/or videos of the geographic areas or itineraries, which may be "stitched," or otherwise sequenced, together to generate video maps 101. Repositories 117 and 119 may also include third-person perspective images/videos of the geographic areas or itineraries, as well. Accordingly, video maps 101 may be experienced via one or more presentation interfaces (e.g., audio and/or visual interfaces) of one or more client devices, such as computing device 103 and wireless device 105. For example, users may be presented with a video map 101, textual information (or instructions), auditory information, indicating a location or route via client devices 103 and 105. Video output may be provided by at least one digital image, and audio output may be provided by digital audio associated with at least a portion of the digital image/video; however, supplementary auditory, textual, and/or graphical information may also be provided either overlaid on a visual presentation or provided as an addendum thereto.

According to various other embodiments, platform 115 may be configured to detect or receive the presence and physical location of users for generating and updating video maps 101 corresponding to, for example, navigational directions. In particular implantations, the location of, for instance, wireless device 105 may be detected without wireless device 105 having to initiate a phone call or other like communication session. In this way, platform 115 may provide users with dynamic travel and point-of-reference information, such as updated video map 101 depictions, updated turn-by-turn directions, updated milestones, etc., corresponding the presence and physical location of users. Platform 115 may further utilize this information, as well as information from repositories 117 and 119, to generate video maps 101, determine optimal routing paths from one location to another, or substantially correlate video map 101 presentations to resemble or equate to "actual" conditions likely to be experienced by users. In this way, repositories 117 and 119 may further include various others forms and types of mapping content, such as one or more first-person perspective images/videos of various geographic locations, third-person perspective mapping information, routing information, places of interest information, etc. This mapping content may be correlated with positioning data (e.g., latitude, longitude, elevation, and the like) and/or direction data (e.g., north, east, south, and west). In other instances, the mapping content may also be correlated with various conditional factors (or aspects) possibly affecting the manner in which a location is experienced. These conditional factors may include weather data (e.g., cloud cover, ice, fog, glair, rain, sleet, snow, visibility, etc.), date/seasonal data (e.g., fall, spring, summer, and winter), lighting/timing data (e.g., dawn, dusk, high noon, night, etc.), transit authority data (e.g., accidents, congestion, road work, detours, and the like), and upcoming events data (e.g., conventions, cultural events, parades, sporting events, etc.), as well as any other suitable conditional variable capable of affecting the perception of a location.

As seen in FIG. 1, system 100 can be configured to support a plurality of client devices even though only two client devices, e.g., computing device 103 and wireless device 105, are depicted. Client devices 103 and 105 may include one or more client programs (not shown) that operate thereon; however, it is contemplated that these client programs may be executed via platform 115 and, thereby, accessible to users via client devices 103 and 105. According to one embodiment, these client programs may relate to one or more graphical user interfaces (GUI) configured to control the presentation of one or more video maps 101. Additionally, the GUIs may be configured to facilitate the acquisitioning, exchanging, managing, sharing, storing, and updating of video maps 101 via client devices 103 and 105. In various instances, network browser applications may be provided for accessing similar applications made available by, for example, platform 115. An exemplary GUI capable of execution on wireless device 105 is more fully described with respect to FIG. 10. Computing device 103 is described in more detail in accordance with FIG. 11.

In an exemplary embodiment, wireless device 105 includes display 121, location module 123, memory 125, processor 127, and user interface module 129; however, wireless device 105 may embody many forms and include other alternative components. Location module 123 can obtain location information using Global Positioning System (GPS) technology, and thus, behaves as a GPS receiver. Wireless device 105 employs location module 123 to communicate with a constellation of satellites 131. These satellites 131 transmit very low power interference and jamming resistant signals received by the GPS receivers 123. At any point on Earth, the GPS receiver 123 can receive signals from multiple satellites (e.g., 6 to 11). Specifically, the GPS receiver 123 may determine three-dimensional geolocation (or spatial positioning information) from signals obtained from at least four satellites. Measurements from satellite tracking and monitoring stations located around the world are incorporated into orbital models for each satellite to compute precise orbital or clock data. GPS signals are transmitted over two spread spectrum microwave carrier signals that are shared by GPS satellites 131. Wireless device 105 needs to identify the signals from at least four satellites 131, decode the ephemeris and clock data, determine the pseudo range for each satellite 131, and compute the position of the receiving antenna. With GPS technology, wireless device 105 can determine its spatial position with great accuracy and convenience.

Additionally, system 100 may employ Assisted GPS (A-GPS) to mitigate the lost of GPS signals from obstructions between the GPS receiver 123 and satellites 131. When operating in A-GPS mode, system 100 can provide for better in building or obstructed view spatial positioning information. Assistance data can be transmitted to wireless device from, for example, wireless network 111. In an exemplary embodiment, A-GPS information may include ephemeris data differential GPS correct data, timing data and other aiding data. Using the aiding (or assistance) data, location module 123 performs spatial positioning calculations via, for example, processor 127. In an exemplary embodiment, wireless device 105 can generate real-time speed and route adherence alerts using this calculated information. Additionally, transmission of the spatial positioning information need not be frequent. Transmission of the geolocation data can be made more compact because it is true location rather than pseudo range data. Also, wireless device 105 can more intelligently request assistance data because the device can itself determine when ephemeris data is no longer valid.

Wireless device 105 utilizes display 121 to present video maps 101 to users. In particular implementations these video maps 101 may include location-to-location navigational directions or other point-of-interest information. In any instance, however, video maps 101 include first-person perspective views of a particular geographic location, which may be correlated to those conditional factors previously mentioned so as to provide users a substantially "real-world" experience, but virtually. Wireless device 105 is also configured to store and execute instructions for supporting the video mapping and travel planning services, as well as other communication functions. Processor 127, memory 125, and/or user interface module 129 are provided for storing and executing these instructions, as well as provided an interface for users to access the function of the video mapping and travel planning services.

In this manner, client devices 103 and 105 may include any device capable of sending and receiving voice and data communications over any of networks 107-113, as well as capable of processing and presenting multimedia content, such as video maps 101, to users. For example, wireless device 105 may be any capable cellular phone, satellite phone, smart phone, wireless phone, or any other suitable mobile device, such as a personal digital assistant (PDA), pocket personal computer, handheld navigational device, tablet, positioning technology, customized hardware, etc. Further, computing device 103 may be any suitable computing device, such as a personal computer (PC), notebook computer, workstation, terminal, server, customized hardware, etc. While not illustrated, it is contemplated that wireless device 105 may be placed in communication with computing device 103 over a wired (e.g., FireWire, universal serial bus, etc.), wireless (e.g., Bluetooth, infrared, etc.), or networked link. As such, video maps 101 may be exchanged between client devices 103 and 105, as well as shared between various users at respective client devices 103 and 105. For management and organizational purposes, video maps 101 as well as various subscription related parameters (e.g., user names, passwords, subscriber demographic information, etc.) may be stored to user profiles repository 133, in accordance with registered user accounts. User profiles may be updated by users via one or more of networks 107-113 via, for example, client devices 103 and 105. User interface module 129 may also be configured to provide users access to these management, organizational, sharing, and user profile functions.

According to various embodiments, the video mapping and travel planning services of platform 115 can be made accessible to client devices 103 and 105 via one or more of networks 107-113. As such, telephony network 109 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Data network 107 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. Although depicted as separate entities, networks 107-113 may be completely or partially contained within one another, or may embody one or more of the aforementioned networks. For instance, service provider network 113 may embody any circuit-switched and/or packet-switched network that includes facilities to provide for transport of circuit-switched and/or packet-based communications. It is further contemplated that any of networks 107-113 may include components and facilities to provide for signaling and bearer communications between the various components and facilities of system 100. Nevertheless, the conjunction of networks 107, 109, 111, and 113 may be adapted to provide the video mapping and travel planning services of system 100, as well as enable user access to platform 115.

As shown, video mapping platform 115 may include mapping module 135, routing module 137, and presence service module 139. It is contemplated, however, that platform 115 may embody many forms. For instance, platform 115 may comprise computing hardware (such as described with respect to FIG. 11), as well as include one or more components configured to execute the processes described herein for providing the video mapping and travel planning services to users at client devices 103 and 105. Furthermore, it is contemplated that the components of platform 115 may be combined, located in separate structures, or separate physical locations. In other words, a specific topology is not critical to embodiments of platform 115 or system 100 for that matter.

According to one embodiment, platform 115 embodies one or more application servers accessible to client devices 103 and 105 over one or more of networks 107-113. In this way, mapping module 135 is configured to retrieve mapping content from repositories 117 and 119 in order to generate video maps 101 from one or more first-person perspective videos. In particular embodiments, mapping module 135 retrieves the mapping content to generate first-person perspective video maps 101 that substantially correspond to expected ambient conditions of, for example, video mapped location-to-location navigational directions. In this manner, routing module 137 is configured to plan a route from a start location to an end location, as well as, in certain embodiments, one or more intermediary locations. Routing module 137 may utilize various link and node data corresponding to a geographic area at least including the start location, end location, and the one or more intermediary locations. Further, platform 115 includes, or utilizes, presence service module 139 to capture presence information or availability of client devices 103 and 105 for providing video maps 101, such as video mapped location-to-location navigational directions. An exemplary model for presence determination is detailed in Internet Engineering Task Force (IETF) Request for Comment (RFC) 2778, which is incorporated herein by reference in its entirety.

Figure 2:
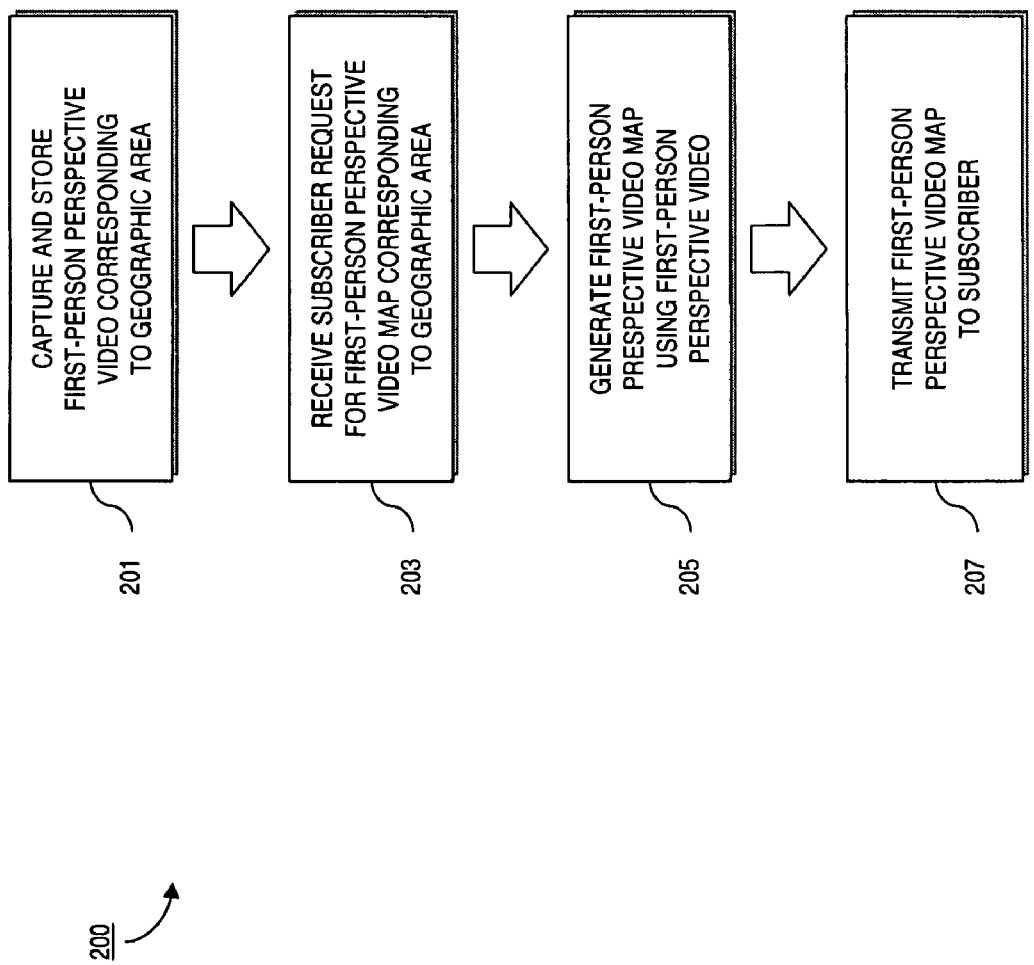
FIG. 2 is an operational flowchart for providing video mapping and travel planning services, according to an exemplary embodiment.

To enhance the ability of users to develop a coherent mental understanding of a geographic area, first-person perspective video maps 101 may be developed and provided to users to correspond to the actual, similar, or predicted conditions of a geographic area. FIG. 2 is an operational flowchart for providing video mapping and travel planning services, according to an exemplary embodiment. For illustrative purposes, flowchart 200 is described with reference to system 100.

In step 201, platform 115 obtains and stores one or more first-person perspective images or videos corresponding to a geographic area in one or more mapping content repositories, e.g., mapping repositories 117 and 119. This process is more fully described below with respect to FIGS. 4 and 5. Next, platform 115 receives a user (e.g., subscriber) request for a first-person perspective video map 101 corresponding to at least a portion of the geographic area, per step 203. In response, platform 115 generates a first-person perspective video map 101 using one or more of the first-person perspective videos, as in step 205. Subsequently, at step 207, platform 115 transmits the first person perspective video map 101 to the user. Steps 203-207 are more fully described below with respect to FIGS. 6-8.

Figure 4:
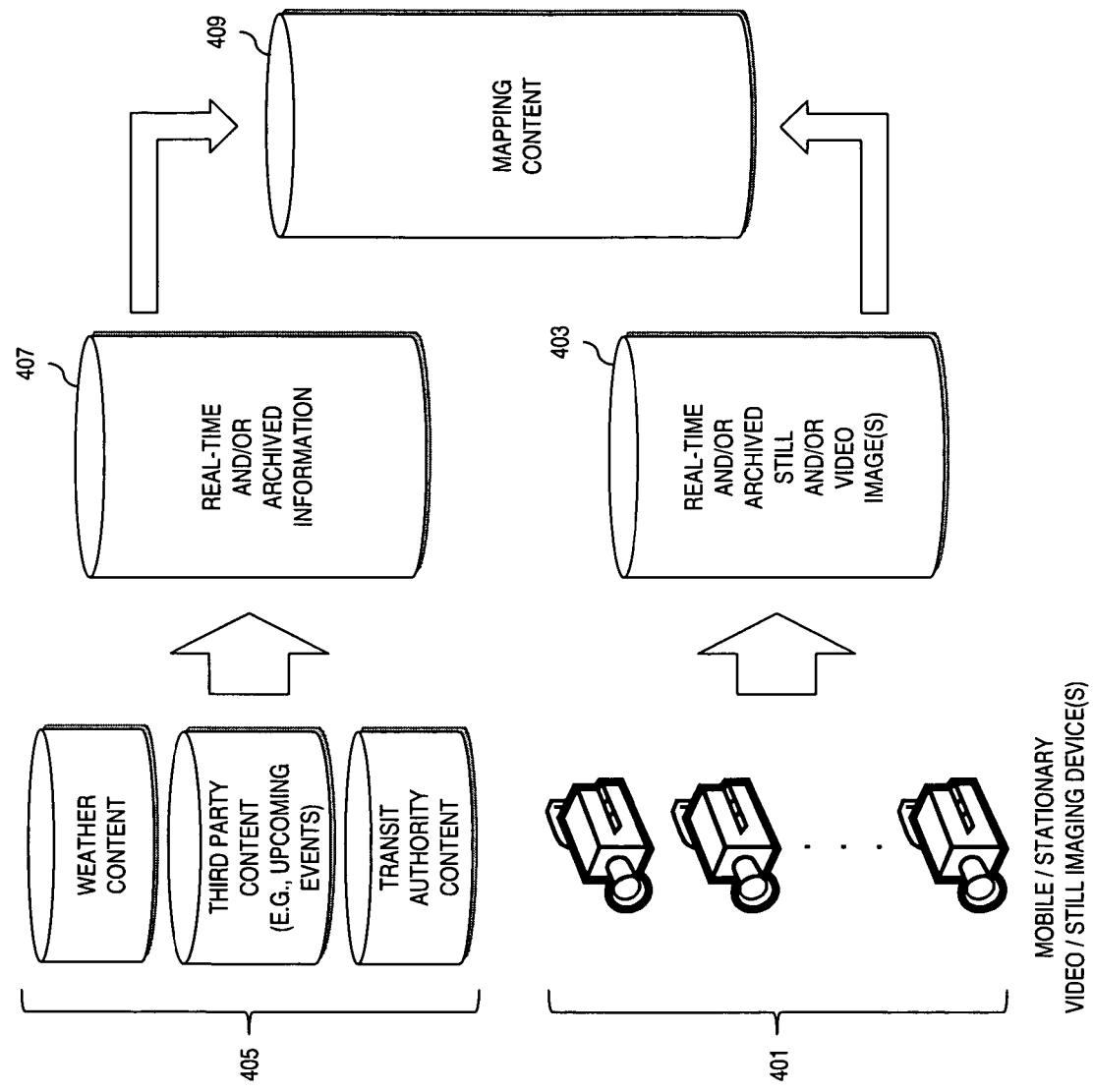
FIGS. 4 and 5 are, respectively, an operational diagram and a flowchart of a process for generating mapping content for video maps, according to an exemplary embodiment.
Figure 5:
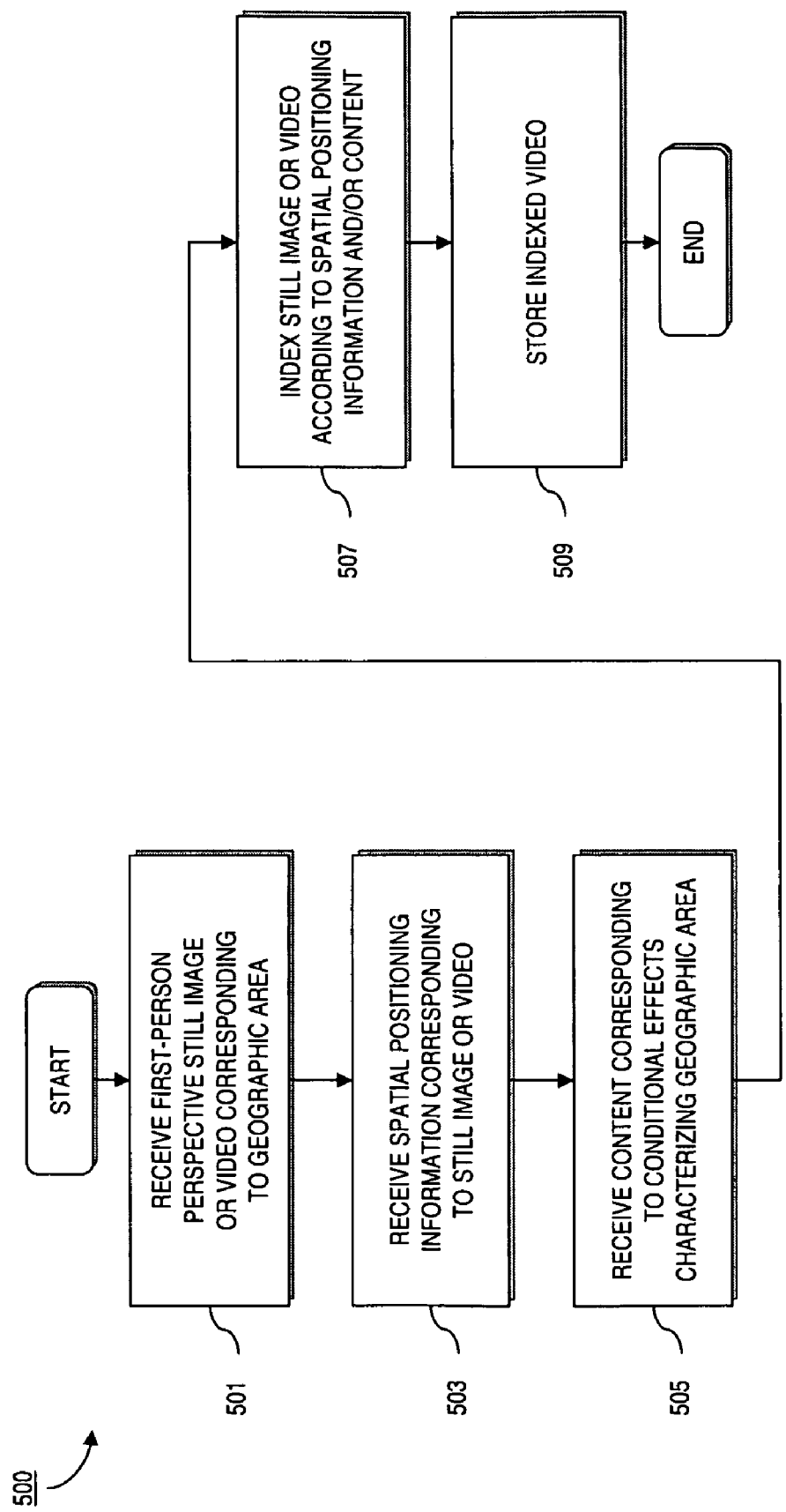

FIGS. 4 and 5 are, respectively, an operational diagram and a flowchart of a process for generating video mapping content, according to various exemplary embodiments. For illustrative purposes, process 500 is described with reference to FIG. 4. It is noted that the steps of process 500 may be performed in any suitable order or combined in any suitable manner.

In step 501, first person perspective still (or photographic) images or video corresponding to a geographic area may be acquired from one or more mobile or stationary imaging devices 401. According to particular embodiments, one or more of imaging devices 401 may be mounted on a mobile vehicle (e.g., delivery vehicle, public transportation vehicle, private-owner vehicle, service vehicle, taxi cab, etc.) or an individual at, for example, one or more orientations, such that as the vehicle or individual traverses through a space, such as a building, sidewalk, street, or any other suitable location, still and/or video images from each of the imaging devices may be recorded. The recording may be provided in real-time or later uploaded to, for example, repository 403. Further, the recording of each or particular still images and/or video may be time coded and associated with spatial positioning information, such as latitude, longitude, elevation, pitch, roll, and yaw.

Per step 503, the spatial positioning information may be acquired from a GPS and/or an inertial navigation system (INS) also equipped to or associated with the vehicle, individual, or one or more of the imaging devices 401. In this manner, a GPS receiver may be located (or associated) with a vehicle, individual, or one or of the imaging devices 401 and a GPS base receiver may be located at a known position. These GPS receivers can be configured to acquire spatial positioning information, e.g., latitude, longitude, and/or elevation, from satellite constellation 131. Accordingly, errors introduced within the GPS satellite information can be eliminated through differential processing of the spatial positioning information gathered by the GPS receiver and the GPS base receiver. The INS may include a plurality of sensors, such as rotation and acceleration sensors, that either periodically, continually, or in an on-demand fashion measure changes in rotation and/or velocity as the vehicle, individual, or one or more of imaging devices 401 move in latitude, longitude, elevation, pitch, roll, and yaw. As such, the INS can provide raw differential spatial positioning information, which may be associated with one or more degrees of freedom, such as six degrees of freedom. This raw differential spatial positioning information may be provided during or between spatial positioning readings of the GPS receiver. This information may also be provided in real-time or later uploaded to, for example, a repository 403.

During step 505, content corresponding to one or more conditional factors characterizing the geographic area may be received from one or more sources, such as sources 405, which may be supplied by the provider of the video mapping and travel planning service and/or one or more third-party content providers. Sources 405 may include conditional factor information corresponding to weather data, date/seasonal data, lighting/timing data, transit authority data, upcoming events data, as well as any other suitable conditional variable capable of affecting the perception of the geographic area. This conditional factor information may be provided in real-time or later uploaded to repository 407.

Thus, in step 507, the received still image(s) and/or video (s) may be indexed based on the spatial positioning information and/or conditional data. That is, the various forms of spatial positioning information may be filtered and, thereby, utilized to compute one or more degrees of freedom for the vehicle, individual, or one or more of the imaging devices 401. This information may be associated with a trajectory of the vehicle, individual, or one or more of the imaging devices 401 that, according to one embodiment, may also be time coded to correspond to the time coding of the still image(s) and/or video(s) recorded via imaging devices 401. As such, the trajectory may be fit through the spatial information to the still image(s) or video(s). Namely, the still image(s) or video (s) may be indexed according to the time coding of the spatial positioning information and the still image(s) or video(s), as well as the multiple degrees of freedom of the vehicle, individual, or one or more of the imaging devices 401. Additionally, the indexed still image(s) or video(s) may be further relationally associated with, or indexed to, the various conditional factors characterizing the geographic area.

Thus, per step 509, the indexed still image(s) and/or video (s) may be stored as mapping content to, for example, repository 409 that, according to particular embodiments, may correspond to one or more of repositories 117 and 119. In this manner, repository 117 may be maintained by the provider of the video mapping and travel planning services of system 100. Further, repository 119 may be maintained by a third-party service provider of such mapping content or portions thereof. In any event, the various forms of mapping content may be supplied to video mapping platform 115 for the generation of first-person perspective video maps 101, as will become more apparent below.

Figure 6:
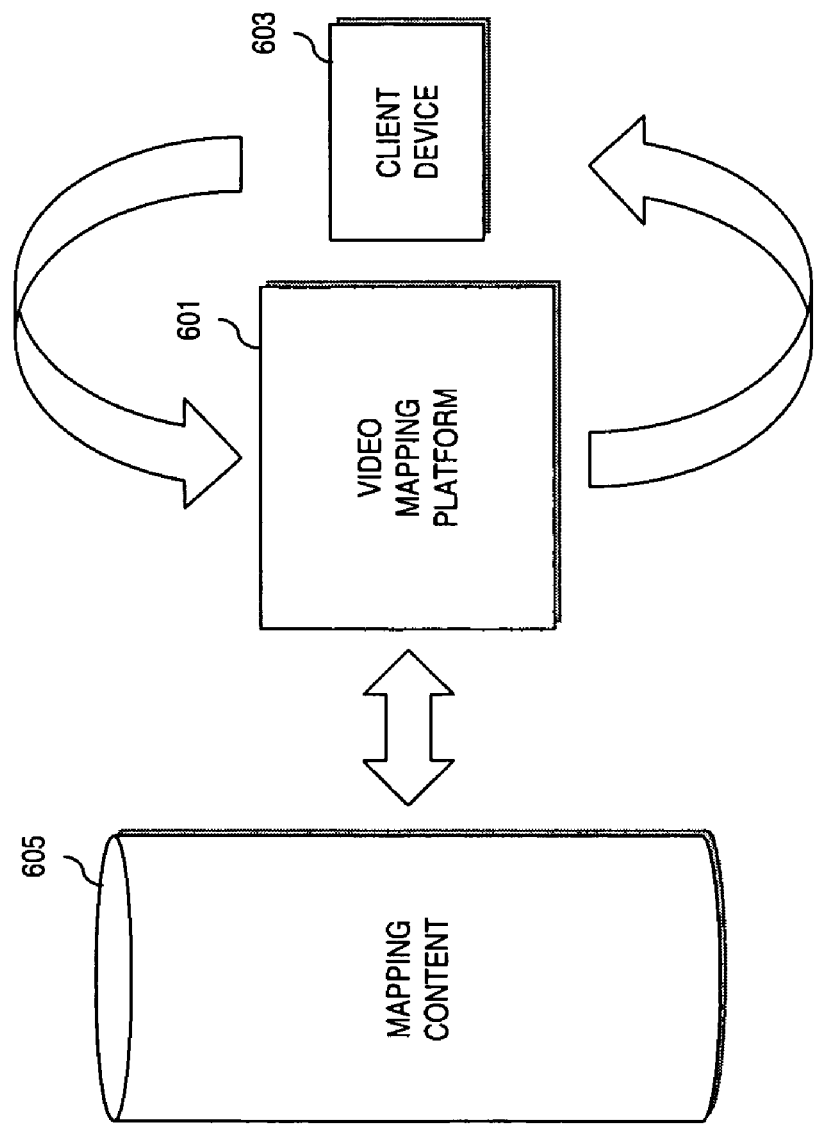
FIGS. 6 and 7 are, respectively, an operational diagram and a flowchart of a process for generating and transmitting video maps to client devices, according to an exemplary embodiment.
Figure 7:
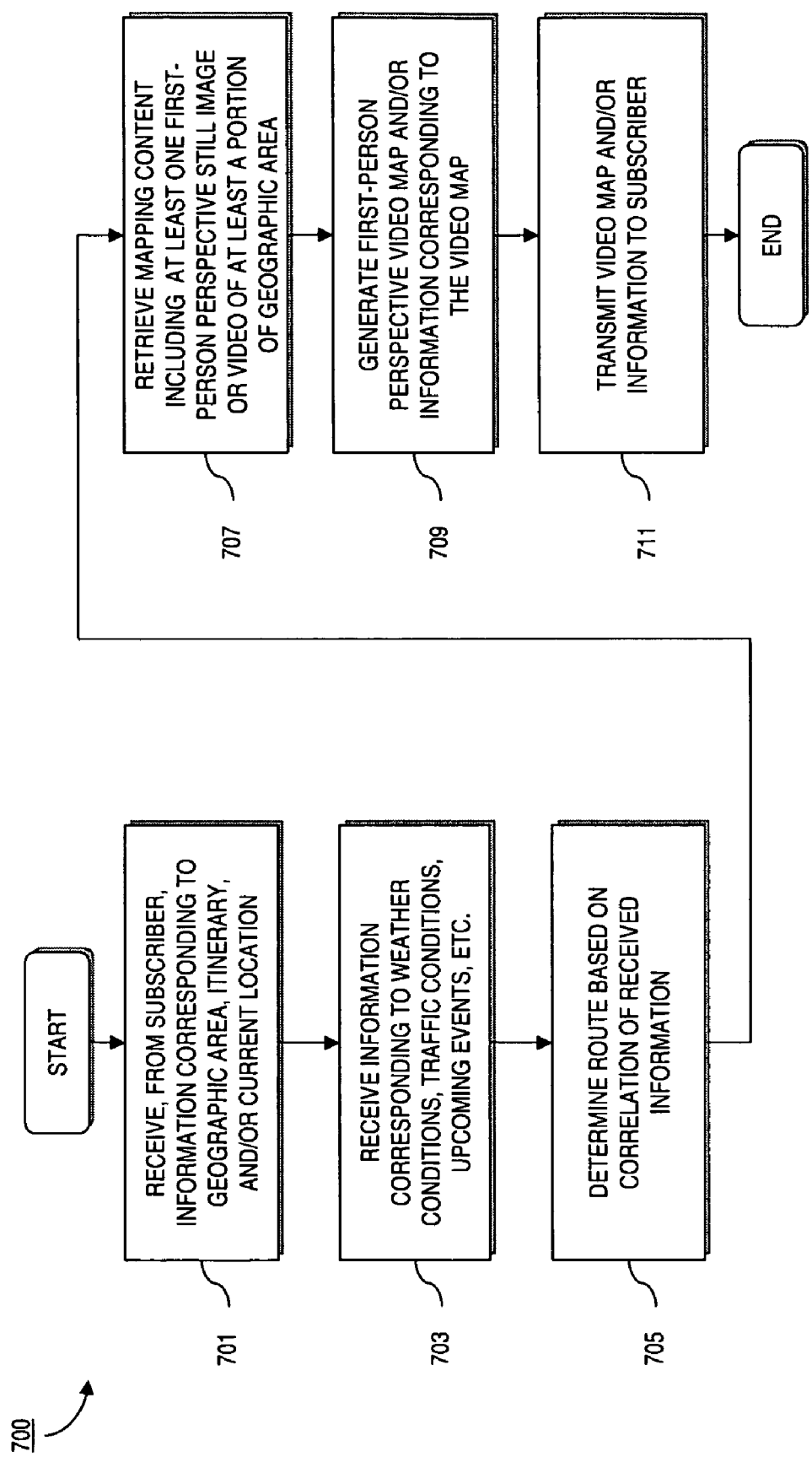

FIGS. 6 and 7 are, respectively, an operational diagram and a flowchart of a process for generating and transmitting video maps to client devices, according to an exemplary embodiment. For illustrative purposes, process 700 is described with reference to the components of FIG. 6. It is noted that the steps of process 700 may not be all inclusive, may include other steps not shown, and may be performed in any suitable order and/or combined in any suitable manner.

In step 701, video mapping platform 601 receives, from a user (e.g., subscriber of the video mapping and travel planning service) at a client device 603, information corresponding to a geographic area, itinerary, and/or current location information. For example, the user may interact with a user interface of client device 603 to signal to platform 601 that a video map 101 is desired, for instance, for location-to-location navigational directions. A request dialog may be displayed via the user interface for the user to specify a start location, end location, and/or expected date/time of travel, as well as other options, such as display formatting options (e.g., video map resolution, size, length, turn-by-turn directions, time estimate of travel, supplementary audio/text directions, places-of-interest overlay information, etc.) and one or more video mapping options (e.g., use of one or more of the conditional factors that might affect the perception of the geographic location). According to one embodiment, the start location may correspond to a current location of the user determined, for example, via location module 123. It is contemplated that the user may be enabled to input various intermediary locations for planning an entire trip, however, for ease of explanation, only one start location and end location are described. Nevertheless, the request dialog enables the user at client device 603 to specify characteristics of a desired video map 101 to be generated by platform 601. This information may be dynamically transmitted to platform 601 or may be transmitted at once by, for example, the user triggering a "send request" function supplied by the user interface (e.g., user interface module 129).

Once the video map request has been received, platform 601 may request and receive information corresponding to one or more conditional factors expected to be experienced by the user, per step 703. This information may be requested and received from mapping content repository 605 based on the date/time of travel input provided by the user. According to one embodiment, the conditional factors might include weather data, date/seasonal data, transit authority data, and upcoming events data, as well as any other suitable conditional variable capable of affecting the perception of the geographic area. Thus, at step 705, platform 601 may determine a travel route based on a correlation of the information received from the user as well as from mapping content repository 603. Namely, routing module 137 may be provided with the start and end locations to route an itinerary from the start location to the end location. In particular embodiments, presence service module 139 may supply routing module 137 with the start location, while the end location may be obtained from the user via the request for a video map 101. In this manner, routing module 137 may utilize various link and node data for a geographic area encompassing the start and end locations to route the itinerary. Once the route is determined, routing module 137 may further determine an expected duration of travel, time of arrival, etc., which may be provided for presentation to the user via, for instance, video map 101.

Based on the determined route, platform 601 may retrieve one or more first-person perspective still images and/or video of at least a portion of the geographic area encompassing the start and end locations, during step 707. That is, mapping module 121 may retrieve mapping content from mapping content repository 605. In particular implementations, the mapping content, i.e., the still image(s) and/or video(s), may be retrieved based on the date/time information, the determined route, and/or one or more of the conditional factors. According to other embodiments, still images and/or video may be acquired from imaging devices 401 in real-time as the same is acquired. Still further, the still images and/or videos may be acquired to substantially correspond to expected ambient conditions, as previously mentioned. Utilizing the retrieved mapping content, mapping module 135 may generate a first-person perspective video map 101 from the start location to the end location, or one or more portions thereof. Namely, the one or more still images and/or video may be sequenced together to form video map 101. In particular implementations, this sequencing process may include averaging, editing, morphing, stitching, or any other suitable video editing process, to generate a video map 101 from multiple still images and/or videos. The resulting video map 101 may be formatted and/or compressed into any video format, such as audio video interleave (AVI) format, a full frame (uncompressed) format, moving picture experts group (MPEG) format, etc. According to certain other embodiments, first-person perspective video maps 101 may be provided with or include third-person perspective video presentations and/or conventional third-person perspective maps and information. As such, platform 601 may transmit, stream, or otherwise provide the video map 101 (or data corresponding to the video map 101) to client device 603, per step 711.

FIG. 8 is a flowchart of a process for dynamically obtaining and presenting video maps to users via client devices, according to an exemplary embodiment. For illustrative purposes, process 800 is described with reference to system 100. At step 801, wireless device 105 establishes a communication session with video mapping platform 115 via one or more of networks 107-113, wherein wireless device 105 submits various itinerary information, e.g., a start location, end location, date of travel, time of travel, etc., corresponding to a geographic area to video mapping platform 115. That is a user (e.g., subscriber of the video mapping and traveling planning services) submits a request for a first-person perspective video map 101 to platform 115 via a GUI application provided by, for example, user interface module 129. For the purposes of explanation, it is assumed that the request for video map 101 is for location-to-location navigational purposes. In response, wireless device 105 may receive all or some portion of video map 101 from video mapping platform 115 over one or more of networks 107-113. According to one embodiment, video map 101 may be generated by video mapping platform 115 "on-the-fly" and, thereby, transmitted to wireless device 105 as one or more streams of mapping data (or information), e.g., multimedia content. In this manner, per step 805, wireless device 105 may receive the mapping information, format it (as necessary), and present it, e.g., display it, to the user as portions of video map 101 via, for example, processor 127, memory 125, and/or display 121. An exemplary presentation is further described in accordance with FIG. 10.

Assuming, for example, the user is utilizing video map 101 for dynamic navigational turn-by-turn directions, wireless device 105 may continually, periodically, or in an "on-demand" fashion request updated video mapping information from platform 115. This "updated" mapping information may be requested based on a comparison of a current position of the user and the end location of the planned itinerary. Namely, in step 807, wireless device 105 determines a current position (e.g., latitude, longitude, elevation, etc.) of the user via, for example, location module 123. Wireless device 105 via, for example, processor 127 may determine whether the current position of the user corresponds to the end location, per step

809. If it does, the process ends. If not, wireless device 105 submits, as in step 811, the current position of the user to video platform 115 in order to obtain either an updated version of video map 101 or a "next" series of mapping information associated with an "on-the-fly" version of video map 101. The process reverts to steps 803-809 until the user arrives at their destination location, i.e., until a current position of the user corresponds to the end location previously provided to video mapping platform 115. In this manner, platform 115 generates and provides video maps 101 to users that substantially correlate to "real-world" experiences and expected ambient conditions.

Figure 9B:
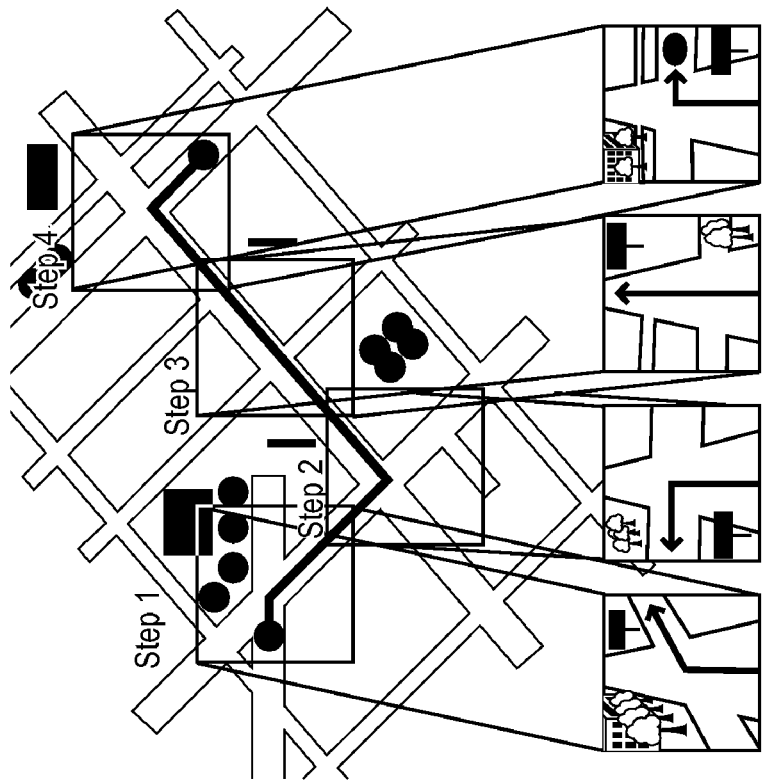
FIGS. 9A and 9B schematically illustrate the correlation between first-person perspective and video map views of an itinerary, according to an exemplary embodiment.
Figure 9A:
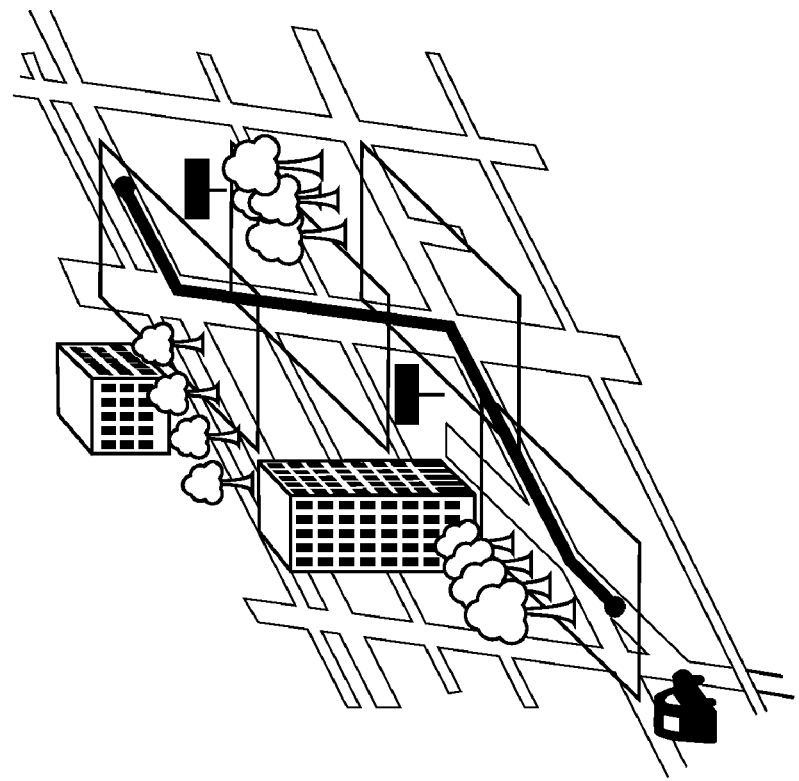

FIGS. 9A and 9B schematically illustrate the correlation between first-person perspective and video map views of an itinerary, according to an exemplary embodiment. For the purposes of illustration, FIGS. 9A and 9B are described with respect to turn-by-turn navigational directions for vehicular travel. It is noted that the video map presentations of FIG. 9B are shown in "cartoon" form for illustrative purposes, however, would correspond to actual depictions of "real-world" locations. As seen, the various video map presentations of FIG. 9B substantially illustrate what the user can expect to experience when traversing the vehicular itinerary shown in FIG. 9A. Since the video map images are provided from a first-person perspective, the user need not engage in any mental or visual translation to experience the geographic area. According to particular embodiments, users of the video mapping and travel planning service may utilize the video map presentations of FIG. 9B to determine weather and road conditions at certain times of day, days of year, etc. Users with special needs may utilize the video map presentations to verify the presence of, for example, wheel chair accessibility features, e.g., curb cuts, accessible sidewalks, roads, etc. Travelers may utilize video map presentations to determine geographic areas to visit, as well as plan their trips at the most beautiful times of year, least busy times, etc.

Figure 10:
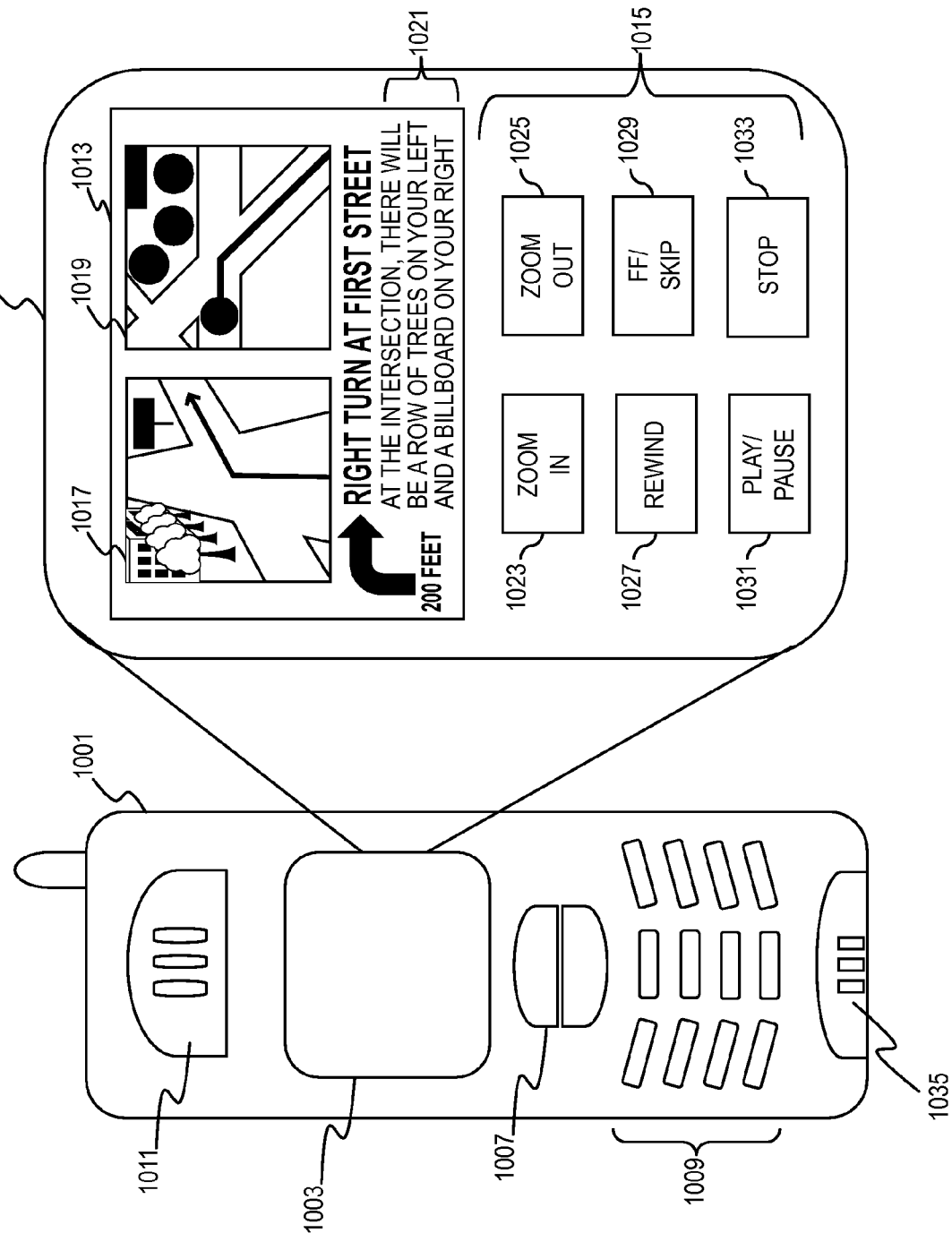
FIG. 10 is a diagram of a wireless device capable of presenting video maps to users, according to an exemplary embodiment.

FIG. 10 is a diagram of a wireless device capable of presenting video maps to users, according to an exemplary embodiment. In this example, users may employ wireless device 1001 to request and obtain video maps 101, which may include video mapped location-to-location navigational directions. As shown, device 1001 includes display 1003 for providing a graphical user interface (GUI) 1005 for requesting, experiencing, and controlling the "playback" of video maps 101, which may be supplemented by cursor buttons 1007 and key pad 1009. An audio interface 1011 may be provided for "playback" of auditory directions, descriptions, or other mapping information, such as nearest gas stations, restaurants, etc., as well as any other suitable point-of-interest information.

According to one embodiment, GUI 1005 includes a display region 1013 and a "soft" control region 1015. Display region 1013 may include first-person perspective video map region 1017, third-person perspective map region 1019, and textual direction region 1021. Meanwhile, soft control region 1015 may include soft controls 1023-1033 for controlling the "playback" of display region 1013 and/or audio interface 1011. For instance, soft controls 1023-1033 may include zoom in 1023, zoom out 1025, rewind 1027, fast forward 1029, play/pause 1031, and/or stop 1033 controls, as well as any other suitable control, such as skip and other display parameters. These functions may also be provided via cursor buttons 1007 and/or key pad 1009. Additionally, GUI 1005 may also be employed for inputting video map requests, such as start and end locations for obtaining navigational video mapped directions, as well as managing or organizing one or more video maps 101 and/or creating or updating user profile information. In such instances, display region 1013 may include one or more fields for inputting mapping and/or travel planning information, while control region 1015 may include one or more soft controls corresponding to, for example, an alphanumeric keyboard or other suitable interface. These soft controls and corresponding displays may be provided via, for example, user interface module 129. According to one embodiment, mapping and/or travel planning information/commands may be conveyed to wireless device 1001 via voice recognition interface 1035, wherein users may provide one or more spoken utterances corresponding to one or more mapping and/or travel planning inputs. Wireless device 1001 may be further utilized to alter a user profile (or user preferences with respect to the video mapping and travel planning services).

The processes described herein for providing video mapping and travel planning services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
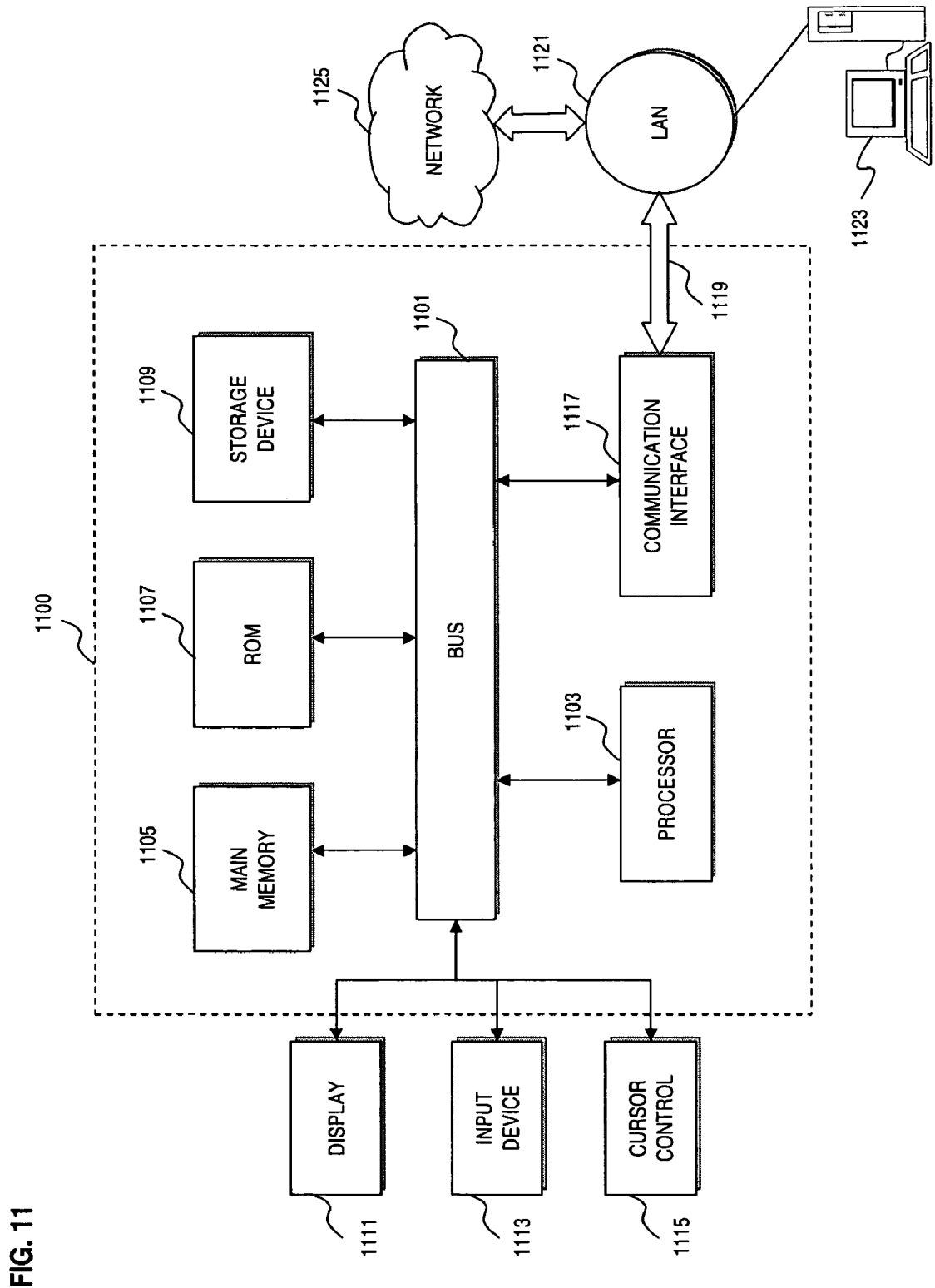
FIG. 11 is a diagram of a computer system that can be used to implement various exemplary embodiments.

FIG. 11 illustrates computing hardware (e.g., computer system) 1100 upon which an embodiment according to the invention can be implemented. The computer system 1100 includes a bus 1101 or other communication mechanism for communicating information and a processor 1103 coupled to the bus 1101 for processing information. The computer system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an embodiment of the invention, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g., for Ethernet™) or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving, from a subscriber over a network, information corresponding to a geographic area as part of a mapping service;
   retrieving, based on the information, a first-person perspective video of at least a portion of the geographic area from a repository including a plurality of first-person perspective videos of the geographic area; and
   generating a first-person perspective video map using the first-person perspective video.

2. A method according to claim 1, further comprising:
   transmitting the first-person perspective video map to the subscriber over the network,
   wherein the first-person perspective video map is streamed in real-time or provided as downloadable content.

3. A method according to claim 1, further comprising:
   receiving a current location of the subscriber; and
   determining a travel route through at least a portion of the geographic area based on the current location and the information,
   wherein the first-person perspective video is also retrieved based on the current location and the travel route.

4. A method according to claim 3, wherein the information includes a start location and an end location for the travel route, the travel route being a driving route or a walking route.

5. A method according to claim 1, wherein the first-person perspective video is captured via one or more mobile imaging devices, the first-person perspective video being associated with, and also retrieved based on, positional information, directional information, or positional and directional information.

6. A method according to claim 1, wherein the first-person perspective video is associated with information corresponding to weather statistics, traffic conditions, upcoming events, or a combination thereof.

7. A method comprising:
receiving, from a subscriber over a network, information corresponding to a geographic area as part of a mapping service;
retrieving, based on the information, a first-person perspective video of at least a portion of the geographic area;
generating a first-person perspective video map using the first-person perspective video;
receiving scheduling information from the subscriber over the network, the scheduling information including date and time data; and
determining one or more geographic conditions of the geographic area based on the scheduling information, the geographic conditions including seasonal and lighting conditions,
wherein the first-person perspective video is also retrieved to substantially correspond to the one or more geographic conditions.

8. A method comprising:
receiving, from a subscriber over a network, information corresponding to a geographic area as part of a mapping service;
retrieving, based on the information, a first-person perspective video of at least a portion of the geographic area;
generating a first-person perspective video map using the first-person perspective video;
transmitting the first-person perspective video map to the subscriber over the network,
wherein the first-person perspective video map is streamed in real-time or provided as downloadable content;
transmitting, to the subscriber over the network, a third-person perspective overhead map corresponding to the first-person perspective video map,
wherein the first-person perspective video map, the third-person perspective overhead map, or the first-person perspective video map and the third-person perspective overhead map include overlay information corresponding to storefronts, landmarks, signs, streets, or a combination thereof, within the geographic area.

9. An apparatus comprising:
a communication interface configured to receive, from a subscriber over a network, information corresponding to a geographic area as part of a mapping service; and
a processor configured to retrieve, based on the information, a first-person perspective video of at least a portion of the geographic area from a repository including a plurality of first-person perspective videos of the geographic area and to generate a first-person perspective video map using the first-person perspective video.

10. An apparatus according to claim 9, wherein the communication interface is further configured to stream the first-person perspective video map to the subscriber over the network in real-time, or provide the first-person perspective video map to the subscriber as downloadable content over the network.

11. An apparatus according to claim 9, wherein the communication interface is further configured to receive a current location of the subscriber, and the processor is further configured to determine a travel route through at least a portion of the geographic area based on the current location and the information corresponding to the geographic area, and also retrieve the first-person perspective video based on the current location and the travel route.

12. An apparatus according to claim 11, wherein the information includes a start location and an end location for the travel route, the travel route being a driving route or a walking route.

13. An apparatus according to claim 9, wherein the first-person perspective video is captured via one or more mobile imaging devices, the first-person perspective video being associated with positional information, directional information, or positional and directional information, and the processor is further configured to retrieve the first-person perspective video based on the positional information, directional information, or positional and directional information.

14. An apparatus according to claim 9, wherein the first-person perspective video is associated with information corresponding to weather statistics, traffic conditions, upcoming events, or a combination thereof.

15. An apparatus comprising:
a communication interface configured to receive, from a subscriber over a network, information corresponding to a geographic area as part of a mapping service; and
a processor configured to retrieve, based on the information, a first-person perspective video of at least a portion of the geographic area and generate a first-person perspective video map using the first-person perspective video,
wherein the communication interface is further configured to receive scheduling information from the subscriber over the network, the scheduling information including date and time data, and the processor is further configured to determine one or more geographic conditions of the geographic area based on the scheduling information, the geographic conditions including seasonal and lighting conditions, and retrieve the first-person perspective video substantially corresponding to the one or more geographic conditions.

16. An apparatus comprising:
a communication interface configured to receive, from a subscriber over a network, information corresponding to a geographic area as part of a mapping service; and
a processor configured to retrieve, based on the information, a first-person perspective video of at least a portion of the geographic area and generate a first-person perspective video map using the first-person perspective video,
wherein the communication interface is further configured to stream the first-person perspective video map to the subscriber over the network in real-time, or provide the first-person perspective video map to the subscriber as downloadable content over the network,
wherein the communication interface is further configured to transmit, to the subscriber over the network, a third-person perspective overhead map corresponding to the first-person perspective video map, such that the first-person perspective video map, the third-person perspective overhead map, or the first-person perspective video map and the third-person perspective overhead map include overlay information corresponding to storefronts, landmarks, signs, streets, or a combination thereof, within the geographic area.

17. A method comprising:
transmitting, over a network, to a service provider of a mapping service, information corresponding to a geographic area;

receiving, over the network, from the service provider, first-person perspective video mapping information corresponding to at least a portion of the geographic area from a repository including a plurality of first-person perspective videos of the geographic area; and presenting the first-person perspective video mapping information to a subscriber of the mapping service.

18. A method according to claim 17, wherein the first-person perspective video mapping information is provided by the service provider as a real-time stream or as downloadable content.

19. A method according to claim 17, further comprising:

transmitting, to the service provider, a current position and direction of the subscriber, wherein the first-person perspective video mapping information is received based on the current position and direction, the first-person perspective video mapping information being related to a travel route of the subscriber.

20. A method according to claim 19, wherein the information includes a start location and an end location for the travel route, the travel route being a driving route or a walking route.

21. A method according to claim 17, further comprising:

transmitting over the network, to the service provider, scheduling information including date and time data, wherein the first-person perspective video mapping information is transmitted to the subscriber to substantially correspond to geographic conditions associated with the date and time data, the geographic conditions including weather conditions, traffic conditions, upcoming event conditions, or a combination thereof.

22. A method according to claim 17, wherein presentation of the first-person perspective video mapping information is controlled by the subscriber, and controls for presentation include playing, pausing, reviewing, fast-forwarding, skipping, zooming, or a combination thereof.

23. A method comprising:

transmitting, over a network, to a service provider of a mapping service, information corresponding to a geographic area;

receiving, over the network, from the service provider, first-person perspective video mapping information corresponding to at least a portion of the geographic area; and presenting the first-person perspective video mapping information to a subscriber of the mapping service, wherein presentation of the first-person perspective video mapping information is combined with presentation of a third-person perspective overhead map corresponding to the first-person perspective video mapping information, one or more of the presentations including overlay information corresponding to storefronts, landmarks, signs, streets, directions, or a combination thereof, within the geographic area.

24. A system comprising:

a repository including a plurality of first-person perspective videos of a geographic area, the first-person perspective videos being acquired from one or more mobile imaging devices and being stored to the repository according to positional and directional information; and a mapping module configured to receive, from a subscriber, information corresponding to the geographic area, to selectively retrieve first-person perspective videos from the repository based on the information corresponding to the geographic area, and to generate a first-person perspective video map using the selectively retrieved first-person perspective videos, wherein the first-person perspective video map is transmitted to the subscriber as part of a mapping service.

25. A system according to claim 24, wherein the mapping module is further configured to receive a current location of the subscriber, to determine one or more geographic conditions of the geographic area, the geographic conditions including seasonal and lighting conditions, and receive from a routing module a driving or walking travel route through at least a portion of the geographic area determined based on the current location, the information corresponding to the geographic area, the one or more geographic conditions, or a combination thereof, the first-person perspective videos also being selectively retrieved based on the current location, the information corresponding to the geographic area, the one or more geographic conditions, or a combination thereof.

* * * * *